Nov. 6, 1934.   J. G. SNIFFIN   1,979,500
SEPARATOR
Filed Dec. 15, 1930   2 Sheets-Sheet 1

INVENTOR.
John G. Sniffin,
BY
R. W. Smith
ATTORNEY.

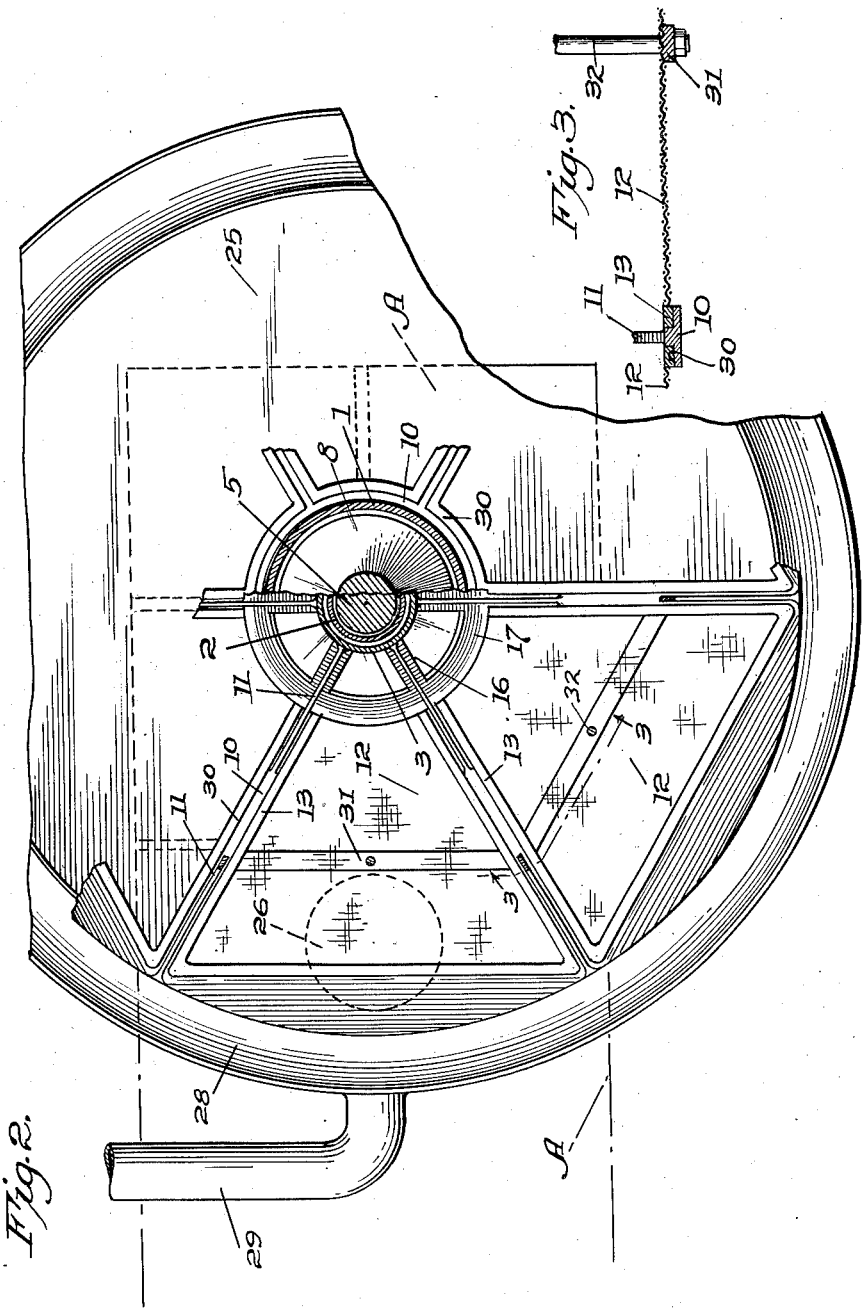

UNITED STATES PATENT OFFICE 1,979,500

SEPARATOR

John G. Sniffin, Huntington Park, Calif., assignor of one-half to John W. McLaughlin, Whittier, Calif.

Application December 15, 1930, Serial No. 502,279

11 Claims. (Cl. 209—271)

This invention is a separator for removing extraneous solids from a fluid, and is particularly applicable for separating sand and the like from the mud fluid which is used in the rotary system of drilling oil wells.

It is the object of the invention to separate the extraneous solids by passing the fluid over a screening surface adapted for ready flow of the fluid therethrough but insuring movement of a large proportion of the solids across the screening surface without clogging the same and without passage therethrough so that the solids may be discharged at the edge of the screening surface and thus separated from the fluid.

Heretofore attempts have been made to separate solids from fluid by flowing the mixed materials axially through a revolving cylindrical screen so that as a result of centrifugal force the fluid is thrown radially outwardly through the screen while the solids are screened against passage therethrough and are thus axially discharged separate from the fluid; but such devices have proved impractical in separating sand from the mud employed in drilling deep wells, since as a result of centrifugal force the sand will tend to clog the screen and prevent free passage of the fluid, or if the size of the mesh of the screen is increased to prevent clogging, a large proportion of the sand will be forced through the screen along with the fluid.

Attempts have also been made to separate solids from fluids by gravity flow of the mixed materials across an inclined vibrating screen, so that the fluid flows through the screen while the vibrating action throws the solid particles clear of the screen so that they gravitate across the inclined surface for final discharge at the lower edge of the screen; but such devices have not been efficient in separating sand and the like from the mud employed in deep wells, since if the slope of the screen is so reduced as to avoid rapid flow of part of the fluid across the screen for discharge with the sand rather than passage through the screen, the force of gravity tending to move the sand across the surface of the screen is so reduced that in spite of the vibrating action tending to throw the sand clear of the screen, a large proportion of the sand will pass through the screen along with the fluid instead of being separately discharged at the lower edge of the inclined screen, while on the other hand if the slope of the screen is increased so as to insure the vibrating sand being ultimately discharged at the lower edge of the screen rather than passing through the screen, a large proportion of the fluid will surge across the surface of the screen for discharge with the sand rather than gravitating through the vibrating screen.

The present invention provides for efficient separation of sand and the like from fluid such as the mud which is circulated in deep wells during the drilling operation, by discharging the mixed sand and fluid mud onto an approximately horizontal screening surface rotating on a vertical axis and vibrating perpendicularly to the plane of its surface, so that the vibration of the screen tends to throw the sand clear of its mesh while permitting free passage of the fluid therethrough, and the centrifugal force of the rotating screen, while not sufficient to cause the fluid to surge across the surface of the screen without passage therethrough, will insure such movement across the screen of the particles of solids which are being constantly thrown clear of the fluid by the vibration of the screen, that substantially all of the fluid passes through the screen for collection in a usual mud pit, while a large proportion of the sand is separately discharged at the periphery of the screen as to provide an extremely efficient means for removing the sand from the fluid mud.

It is a further object of the invention to arrange an extremely simple but practical mechanism providing the desired vibration of a substantially horizontal screen rotating on a vertical axis, with the screening element preferably readily replaceable in the event of wear, and the mixture of fluid mud and sand readily drawn from a usual source of supply and discharged onto the screening surface with the fluid mud from which the sand has been separated then returned by gravity to the usual mud pit.

Further object of the invention will be readily understood from the following description of the accompanying drawings, in which:

Fig. 2 is a transverse section on the line 2—2 of Fig. 1.

Fig. 3 is a detail section on the line 3—3 of Fig. 2.

Figure 1:
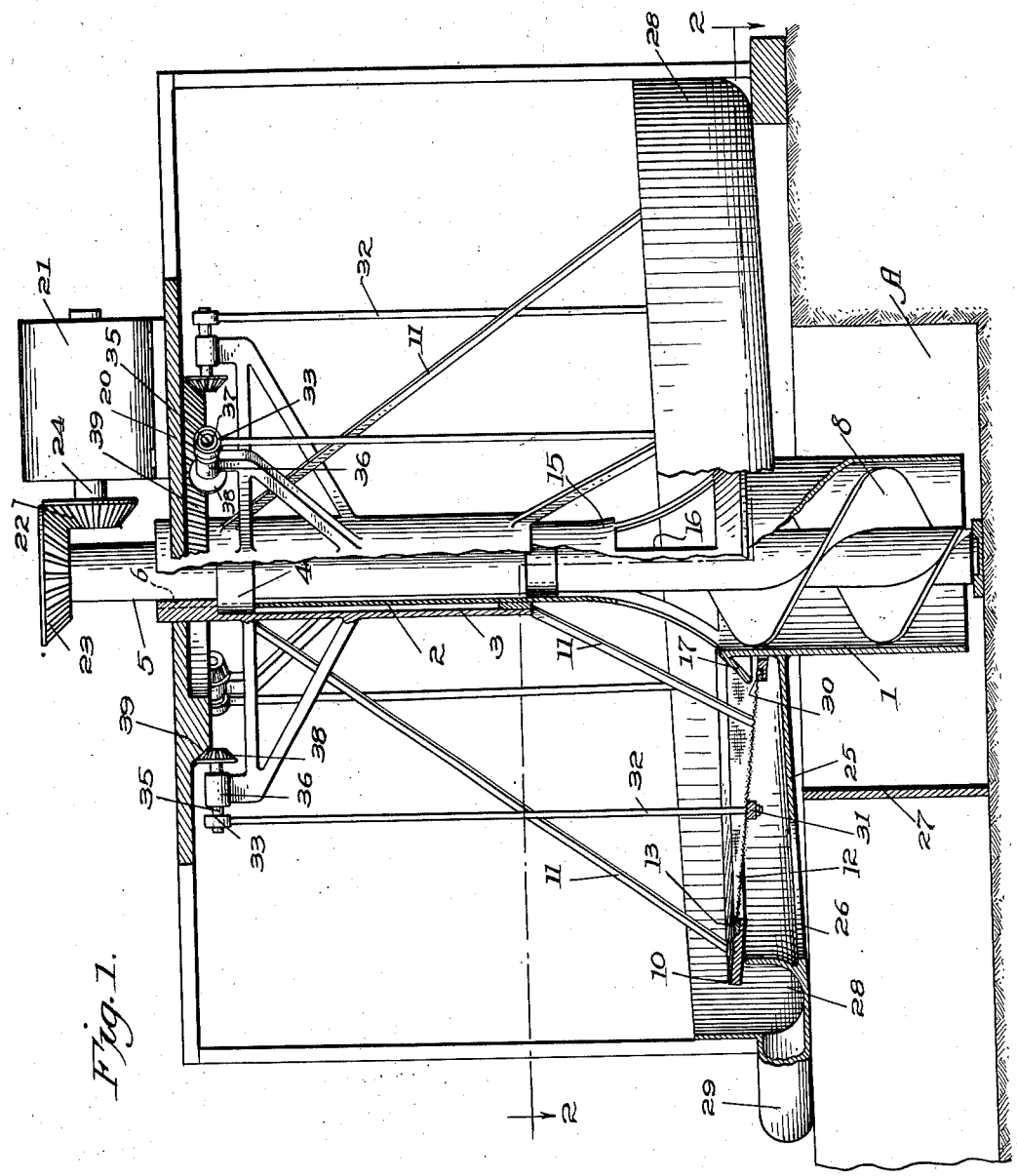
Fig. 1 is a front elevation of the apparatus partly in axial section.

The illustrated embodiment of the invention is particularly applicable for separating sand from the mud fluid which is circulated in a deep well during rotary drilling, and for this purpose the apparatus is shown mounted over a usual mud pit A which is the source of supply for the fluid mud which is to be circulated in a well.

The apparatus preferably comprises a cylinder 1 mounted in the mud pit and projecting thereabove, with a vertical hollow spindle 2 projecting upwardly from the cylinder and having an elongated sleeve 3 journaled thereon and preferably supported by a usual thrust bearing 4. A vertical drive shaft 5 is journaled in spindle 2 and is adapted to rotate the sleeve 3, for which purpose the sleeve may be splined on the shaft as shown at 6; and the shaft is also adapted to drive a rotary conveyor for elevating fluid in cylinder 1, the rotary conveyor being shown as a usual screw conveyor 8 mounted on the lower end of the shaft and rotating in cylinder 1.

The screening surface of the apparatus is mounted in an approximately horizontally projecting frame 10, which is journaled on cylinder 1 and suspended by arms 11 from the sleeve 3; and the screening surface preferably compresses a plurality of screen elements mounted independently of one another in frame 10 for separate removal and replacement when worn, and each comprising a screen 12 of suitable mesh mounted in a marginal frame 13, with the frames 13 of the plurality of screen elements adapted for juxtaposition in frame 10 so that together they form an annular screening surface as shown in Fig. 2.

The mud fluid from which the apparatus is adapted to separate extraneous solids such as sand, is supplied to cylinder 1 from the inlet end of mud pit A, and the revolving conveyor 8 elevates the mud fluid in cylinder 1 and discharges the same onto the screening surface of the apparatus. For this purpose the cylinder 1 preferably merges into spindle 2 at a tapering neck 15 which is just above the frame 10, and the tapering neck is ported as shown at 16 for discharge of mud fluid onto the screen elements at their inner peripheries, with the lower end of the tapering neck preferably projecting outwardly and downwardly beyond the upper end of cylinder 1 so as to form a discharge apron 17.

The upper end of sleeve 3 may be journaled in a main supporting frame 20, and shaft 5 preferably projects upwardly beyond the sleeve and is driven in any suitable manner, preferably by an electric motor 21 mounted on frame 20, with bevel gears 22—23 forming a driving connection between the motor shaft 24 and the main drive shaft 5. The shaft 5 is thus adapted to rotate conveyor 8 for elevating fluid mud and discharging the same through ports 16 and downwardly across apron 17 onto the screening surface at its inner periphery, and at the same time the shaft 5 rotates the frame 10 so that the flow across the screening surface is subject to centrifugal force.

The fluid mud constituent of the flow thus tends to gravitate through the screens 12 while solids such as sand are moved across the surfaces of the screening elements by centrifugal force and are finally discharged at the outer periphery of the screening surface, with the fluid mud which gravitates through the screens collected on an underlying apron 25 which is preferably slightly inclined as shown in Fig. 2 and provided with a discharge port 26 at its lowest point, whereby the mud fluid is returned to the discharge end of the mud pit A beyond a gate 27 which is adapted to separate said discharge end of the mud pit from its inlet end with which the cylinder 1 communicates. An annular trough 28 underlying the outer periphery of frame 10 is preferably adapted to collect the centrifugally discharged sand so as to separate it from the mud fluid, and the trough may be inclined as shown in Fig. 2, with a discharge pipe 29 at its lowest point adapted to draw off the sand.

In order to prevent such centrifugal flow of the fluid mud as would cause it to surge across the screening surface and discharge into trough 28 rather than gravitating through the screens 12, the screening surface while approximately horizontally disposed, is as shown in Fig. 2, preferably slightly inclined upwardly toward its outer periphery at such angle that centrifugal force will move the sand and other solids radially outwardly across the screening surface while the mud fluid will be retarded and will thus gravitate through the screens; and in order to insure centrifugal movement of the sand across the screening surface, the flow is preferably agitated so as to tend to throw the solids vertically clear of the mud fluid in order that the solids will not clog the screens and will be freely subject to centrifugal force, while the mud fluid flowing across the screens will gravitate therethrough.

For this purpose the screen elements are preferably vibrated perpendicularly to the planes of their surfaces, with the drive shaft 5 preferably supplying the power for so vibrating the screens; and the independent screening elements 13 are preferably loosely mounted in frame 10 so that the vibration of their screens 12 does not cause undue stress or strain.

As an instance of this arrangement the frames 13 of the screening elements may rest in grooves 30 formed in peripheral and radial elements of frame 10, with reinforcing strip 31 medially underlying each screen 12 and connected to the sides of its frame 13; and an actuating rod 32 preferably projects upwardly from each of the strips 31 medially of its length and is provided at its upper end with a bearing 33 eccentrically journaled on a cooperating rotating shaft 35, so that the actuating rods and the screens 12 which are connected thereto are vertically vibrated by the rotation of shafts 35. The shafts 35 may be journaled in bearings 36 which are supported by sleeve 3 so that the shafts 35 project radially outwardly just below frame 20 and in position for journalling the bearings 33 of the respective actuating rods on eccentrics 37 at the outer ends of the respective shafts; and the shafts 35, which are thus revolved around the axis of shaft 5 along with the sleeve 3, may be rotated by bevel pinions 38 at their inner ends meshing with a bevel ring gear 39 which depends from the underside of stationary frame 20.

The invention thus provides an extremely compact and practical mechanism whereby the drive shaft 5 rotates conveyor 8 for elevating fluid mud having sand and the like mixed therewith, with the flow discharging onto a screening surface which is rotated and vibrated by the drive shaft so that the solids are thrown clear of the mud by said vibrations, and are thus moved across the screening surface by centrifugal force and clear of the mesh of the screen for discharge into trough 28, while the fluid mud is moved centrifugally across and up the slight incline of the screening surface at a speed whereby it will gravitate through the screening surface before reaching its outer periphery. The sand and the like is thus readily separated and collected in trough 28, while the fluid mud which has been freed of extraneous solids collects on apron 25 for gravity flow into mud pit A.

I claim:

1. A separator comprising a supporting screen adapted for rotation on a vertical axis, a rotatable spiral conveyor having its axis concentric with the vertical axis of the screen and adapted to elevate mixed solids and fluid from a source of supply onto the screen adjacent its axis for centrifugal discharge of the solids from the screen and passage of the fluid through the screen, a drive shaft at said vertical axis, and means for rotating both the screen and the conveyor by said drive shaft.

2. A separator comprising a supporting screen adapted for rotation on a vertical axis, means for vibrating the screen, a rotatable spiral conveyor having its axis concentric with the vertical axis of the screen and adapted to elevate mixed solids and fluid from a source of supply onto the screen adjacent its axis for centrifugal discharge of the solids from the screen and passage of the fluid through the screen, a drive shaft at said vertical axis, and means for actuating the vibrating means and rotating both the screen and the conveyor by said drive shaft.

3. A separator comprising a stationary frame, a sleeve rotatable on a vertical axis in the frame, a rotatable screening surface suspended from the sleeve, means for rotating the sleeve, a bearing supported by the rotating sleeve, means for vibrating the screening surface including an eccentric mounted on a shaft which is journaled in the bearing, and a driving connection between said shaft and the stationary frame for rotating the shaft by the movement thereof around the axis of the rotating sleeve.

4. A separator comprising a vertical conduit, a spindle projecting upwardly from the conduit, a sleeve journaled on the spindle, a screening surface suspended from the sleeve and journaled on the conduit, a drive shaft journaled in the spindle and extending into the conduit, means for rotating the sleeve by the drive shaft, means in the conduit fixed to the drive shaft for elevating material in said conduit, and means for discharging elevated material from the conduit onto the screening surface.

5. A separator comprising a vertical conduit having an intake at its lower end and a discharge vertically spaced above said intake, a shaft journaled in the conduit and projecting above the same, a conveyor fixed on the shaft in the conduit, a screening surface, and means for suspending the screening surface from the upper portion of the shaft so as to underlie the discharge and rotate with the shaft.

6. A separator comprising a rotatable screening surface, a bearing rotatable with the screening surface, a shaft journaled in the bearing, means for vibrating the screening surface including an eccentric fixed on the shaft, and means for rotating the shaft by its movement around the axis of the rotatable screening surface.

7. A separator comprising a rotatable screening surface, a plurality of circumferentially spaced bearings rotatable with the screening surface, a shaft journaled in each bearing, means for vibrating the screening surface, said vibrating means including an eccentric fixed on each shaft and actuating rods connected to the respective eccentrics and engaging the screening surface at circumferentially spaced points which are radially spaced from the axis of the screening surface, and means for rotating the plurality of shafts by their movement around the axis of the screening surface.

8. A separator comprising a rotatable screening surface, a plurality of reciprocating rods adapted to vibrate the screening surface and revolving with the screening surface and engaging the same at circumferentially spaced points which are radially spaced from the axis of the screening surface, and a common drive means for rotating the screening surface and reciprocating the rods.

9. A separator comprising a rotatable screening surface embodying a plurality of independently supported screening elements, and a plurality of reciprocating rods revolving with the screening surface and engaging the respective screening elements for vibrating the same independently of one another.

10. A separator comprising a rotatable screening surface, a plurality of reciprocating rods adapted to vibrate the screening surface and revolving with the screening surface and engaging the same at circumferentially spaced points which are radially spaced from the axis of the screening surface, and a common drive means for rotating the screening surface and continuously reciprocating each of the rods.

11. A separator comprising a rotatable screening surface embodying a plurality of independently supported screening elements, and a plurality of continuously reciprocating rods revolving with the screening surface and engaging the respective screening elements for continuously vibrating the screening elements independently of one another.

JOHN G. SNIFFIN.